US007702479B2

(12) United States Patent
Cheemalapati et al.

(10) Patent No.: US 7,702,479 B2
(45) Date of Patent: Apr. 20, 2010

(54) ON-BOARD GUARD-BAND CHAMBER ENVIRONMENT EMULATOR

(75) Inventors: Srinivas Cheemalapati, Morrisville, NC (US); Jimmy Grant Foster, Sr., Morrisville, NC (US); Timothy J. Schlude, Cary, NC (US); Philip Louis Weinstein, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1335 days.

(21) Appl. No.: 11/127,746

(22) Filed: May 12, 2005

(65) Prior Publication Data

US 2006/0259203 A1 Nov. 16, 2006

(51) Int. Cl.
*G01D 18/00* (2006.01)
(52) U.S. Cl. ........................... 702/108; 702/132; 703/24
(58) Field of Classification Search .................. 702/99, 702/108, 130, 132, 136; 703/21, 24; 374/5, 374/43
See application file for complete search history.

(56) References Cited

U.S. PATENT DOCUMENTS

| | | | |
|---|---|---|---|
| 4,336,489 A | | 6/1982 | Frederiksen |
| 4,379,259 A | | 4/1983 | Varadi et al. |
| 5,023,476 A | | 6/1991 | Watanabe et al. |
| 5,634,001 A | | 5/1997 | Mittl et al. |
| 5,834,856 A | * | 11/1998 | Tavallaei et al. ............... 307/64 |
| 5,835,504 A | * | 11/1998 | Balkin et al. ................ 714/723 |
| 6,003,150 A | | 12/1999 | Stroud et al. |
| 6,049,896 A | | 4/2000 | Frank et al. |
| 6,304,983 B1 | | 10/2001 | Lee et al. |
| 6,326,800 B1 | | 12/2001 | Kirihata |
| 6,385,098 B2 | | 5/2002 | Butler et al. |
| 6,446,520 B1 | | 9/2002 | Nagai et al. |
| 6,580,597 B2 | * | 6/2003 | Kanouda et al. ............. 361/502 |
| 6,856,926 B2 | * | 2/2005 | Monfared et al. ............. 702/75 |
| 7,222,043 B2 | * | 5/2007 | Augustin et al. ............. 702/132 |
| 7,238,517 B2 | * | 7/2007 | Atwood et al. ........... 435/286.1 |
| 2002/0152406 A1 | * | 10/2002 | Watts et al. .................. 713/300 |
| 2003/0051167 A1 | * | 3/2003 | King et al. ................... 713/201 |
| 2004/0024557 A1 | * | 2/2004 | Chi et al. ..................... 702/121 |
| 2005/0160272 A1 | * | 7/2005 | Teppler ....................... 713/178 |

FOREIGN PATENT DOCUMENTS

JP 4069916 A 3/1992

OTHER PUBLICATIONS

G.W. Baumann, L. Dockendorf and R.F. Korsch, Automated Attribute Pre-Control for Infrequent Defects, IBM Technical Disclosure Bulletin, vol. 35, No. 7, Dec. 1992, pp. 23-27.

* cited by examiner

*Primary Examiner*—Hal D Wachsman
*Assistant Examiner*—Mary C Baran
(74) *Attorney, Agent, or Firm*—Cynthia G. Seal; Law Office of Jim Boice

(57) ABSTRACT

A method and system for testing a computer is presented. The temperature of the computer is controlled by one or more on-board fans inside the computer's enclosure. Voltages are controlled at the Voltage Regulator Module (VRM) level. A test program is then run under varying temperature and VRM voltages, and the results of the test program are logged. The present invention can be used either at the manufacturer's location or the customer's site, either under local or remote control.

17 Claims, 3 Drawing Sheets

ON-BOARD GUARD-BAND CHAMBER ENVIRONMENT EMULATOR

BACKGROUND OF THE INVENTION

1. Technical Field

The present invention relates in general to the field of computers, and in particular to computers being tested. Still more particularly, the present invention relates to a method and system for emulating a guard-band test chamber environment in a stand-alone computer, thus eliminating the need for the guard-band test chamber.

2. Description of the Related Art

Computer systems are traditionally bench tested by a manufacturer before being shipped to a customer. This bench testing, which may be performed on every computer or just on randomly selected units, is often done in a test chamber known as a sealed guard-band chamber. The guard-band chamber, when sealed, controls ambient temperature and humidity, as well as the voltage level of the main supply power source to the computer under test. As its name implies, the guard-band chamber is able to adjust a guard-band, which is defined as adjustable parameters made to a Device Under Test (DUT) test specification, such as the ambient temperature and humidity as well as DUT supply voltage levels.

During testing, one or more computers are physically placed inside the guard-band chamber. The computer is then tested, typically for 24 hours, using a "burn in" test program that may be modified by the guard-band parameters. Output values from the burn in test program are recorded, and the computer either passes or fails some or all of the burn-in test program.

In a high volume manufacturing environment, it is not feasible to use a sealed guard-band chamber to test more than a very small percentage of manufactured computers, due to time and space constraints. What is needed, therefore, is a method for testing a computer, either at the manufacturer's facility or at the customer's site, under conditions similar to those created by a sealed guard-band chamber.

SUMMARY OF THE INVENTION

In response to the shortcomings of the prior art system described, the present invention is thus directed to a method and system for testing a computer. The temperature of the computer is controlled by one or more on-board fans inside the computer's enclosure. Voltages are controlled at the Voltage Regulator Module (VRM) level. A test program is then run under varying temperature and VRM voltages, and the results of the test program are logged. The present invention can be used either at the manufacturer's location or the customer's site, either under local or remote control.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
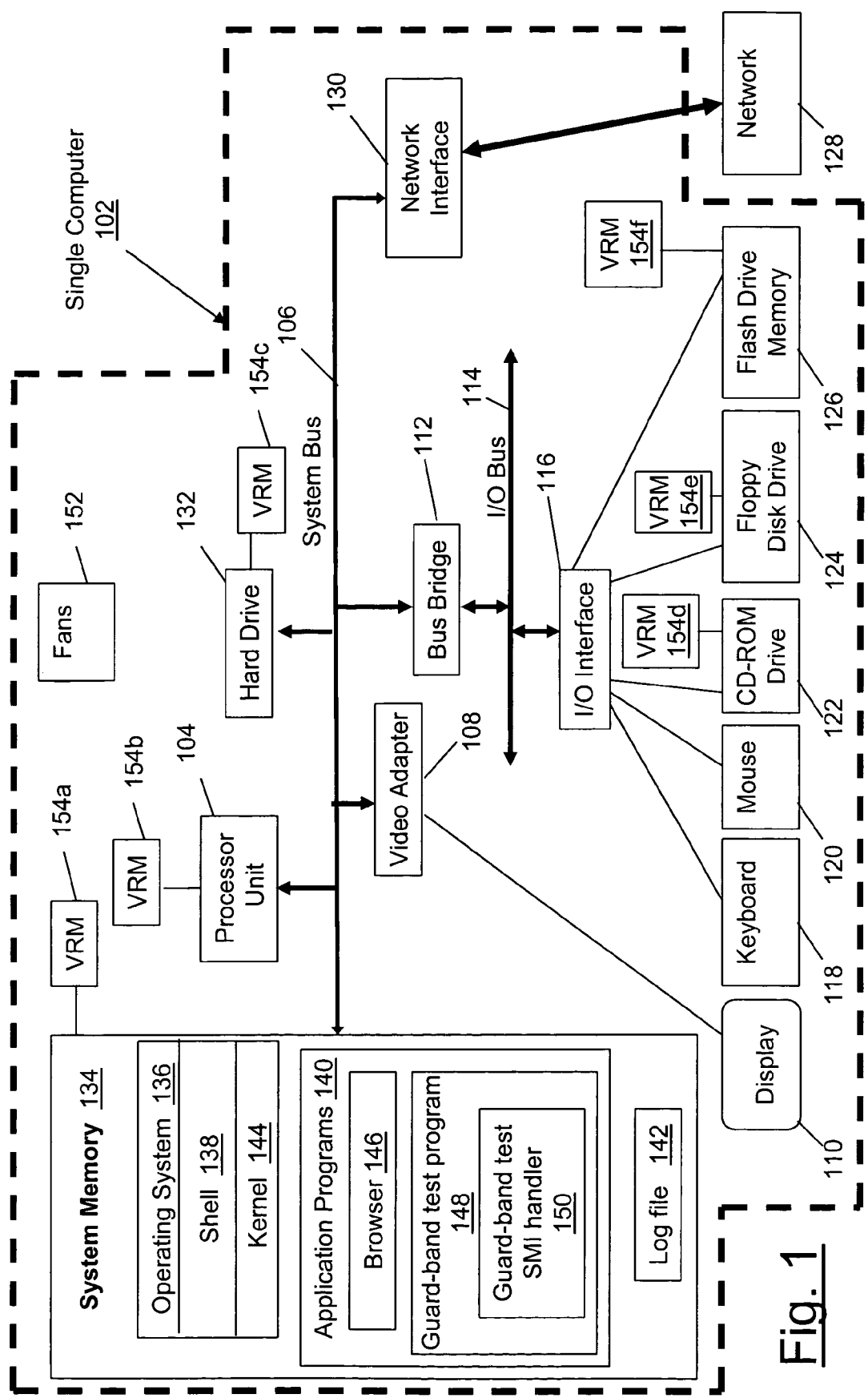
FIG. 1 depicts an exemplary single computer system that can use the inventive testing method.

With reference now to the figures, and in particular FIG. 1, there is depicted a block diagram of an exemplary data processing system that may be used in accordance with the present invention. Depicted is a single computer 102, which may be a stand-alone personal computer, or alternatively a server blade in a server blade chassis. Single computer 102 includes a processor unit 104 coupled to a system bus 106. Also coupled to system bus 106 is a video adapter 108, which drives/supports a display 110.

System bus 106 is coupled via a bus bridge 112 to an Input/Output (I/O) bus 114. Coupled to I/O bus 114 is an I/O interface 116, which affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Single computer 102 is able to communicate with a network 128 via a network interface 130, (for example, a Network Interface Card—NIC), which is coupled to system bus 106. Network 128 may be a Local Area Network (LAN), or preferably is a Wide Area Network (WAN) such as the Internet.

Also coupled to system bus 106 is a hard drive 132. In a preferred embodiment, hard drive 132, along with firmware such as found in a Basic Input/Output System (BIOS) chip (not shown), populates a system memory 134, which is also coupled to system bus 106. Data that populates system memory 134 includes single computer 102's operating system 136, which includes a command interpreter program known as a shell 138, which is incorporated in a higher level operating system layer and utilized for providing transparent user access to resources such as application programs 140 and a log file 142.

As is well known in the art, a command interpreter or "shell" is generally a program that provides an interpreter and interfaces between the user and the operating system. More specifically, a shell program executes commands that are entered into a command line user interface or from a file. The shell (UNIX) or command processor (Windows) is generally the highest level of the operating system software hierarchy and serves as a command interpreter. The shell typically provides a system prompt, interprets commands entered by keyboard, mouse, or other user input media, and sends the interpreted command(s) to the appropriate lower levels of the operating system (e.g., a kernel 144) for processing.

Exemplary application programs 140 used in the present invention are a web browser 146 and a guard-band test program 148. Web browser 146 includes program modules and instructions enabling a World Wide Web (WWW) client (i.e., single computer 102) to send and receive network messages to the Internet using HyperText Transfer Protocol (HTTP) messaging. Guard-band test program 148, along with its associated guard-band test SMI handler 150, is a program that is discussed in further detail below in FIGS. 2 and 3, and essentially allows single computer 102 to autonomously emulate a guard-band chamber environment. Log file 142 is a log of test outputs resulting from the execution of guard-band test program 148, and will be discussed in additional detail below.

Within an enclosure housing single computer 102 are two additional components that are essential in performing a preferred embodiment of the present invention: fans 152 and Voltage Regulator Modules (VRMs) 154. Fans 152 cool the interior of the enclosure. In a preferred embodiment, one of the fans 152 is located both directly on processor unit 104 as part of a heat sink (not shown), while another fan 152 is mounted within the enclosure to provide general ambient cooling for single computer 102.

In a preferred embodiment, different components and/or component groups within single computer 102 have their own assigned VRM 154, in order to provide the proper voltage level to a particular component or class of components. For example, VRM 154a may provide a different voltage level to system memory 134 than VRM 154b provides to processor unit 104, depending on each component's power requirements. Each component has an optimum range of operating voltage requirements. Thus, if the voltage being supplied is too high, too low, intermittent or "dirty," then there is a likelihood that a particular component or class of components will malfunction.

Note that the hardware elements depicted in single computer 102 are not intended to be exhaustive, but rather are representative to highlight essential components required by the present invention. For instance, single computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
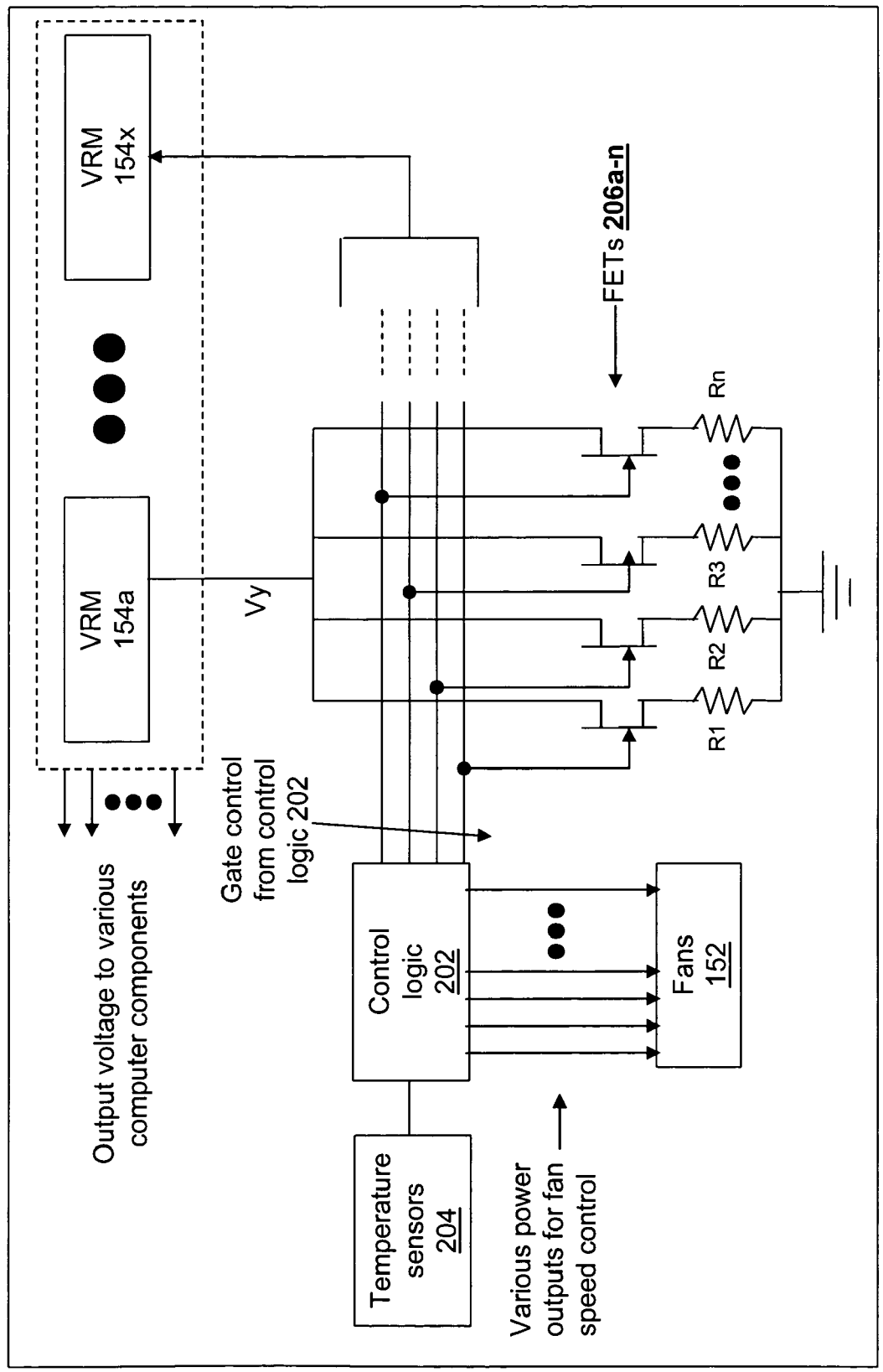
FIG. 2 illustrates control logic within the single computer system shown in FIG. 1 for emulating a sealed guard-band chamber.

With reference now to the FIG. 2, there is depicted circuitry used within single computer 102 to enable the present invention. As will be described in further detail in FIG. 3, the present invention uses a control logic 202 to control the voltage level being supplied to and by VRMs 154 as well as voltage levels going to fans 152, or by using Pulse Width Modulation (PWM) or other means understood by those skilled in the art of voltage adjustment.

Control logic 202 provides a gate control to lines between VRMs 154 and Field Effect Transistors (FETs) 206a-n, which turn off and on current passing through resistors R1 through Rn. This current results in a known voltage level being created and supplied to a particular VRM 154. Control logic 202 is thus able to control the voltage level being supplied to a particular VRM 154, which then outputs/supplies a corresponding (preferably, but no necessary different) voltage level to a particular associated component as shown in FIG. 1. For example, assume that FET 206a, connected to "R1," is turned on. A voltage specific for that caused by a constant current through R1 causes "Vy" to take on a voltage "V1," which is supplied to VRM 154a. If FET 206b, connected to "R2," were turned on, then a different voltage "V2" would be created and supplied to VRM 154a. A similar array of resistors R1-n and FETs 206a-n (not shown) are provided for each other VRM 154 up to VRM 154x.

In addition, control logic 202 is able to receive an input from temperature sensors 204, and supply an appropriate voltage level or control signal to fans 152 to control their speed in order to keep the temperature sensed at a particular level. These voltage levels can be created using circuitry described above for supplying specific voltage levels to VRMs 154, or by any other adjustable voltage supply circuit or control signal chosen by the user. The temperature sensors 204 can be from any area within the housing (enclosure) of single computer 102, including point specific areas such as on the processor unit 104, etc. Control logic 202, using instructions/parameters from guard-band test program 148, is able to maintain a preferred test temperature range by varying power outputs or control signals to the fans 152 to control their speed.

Figure 3:
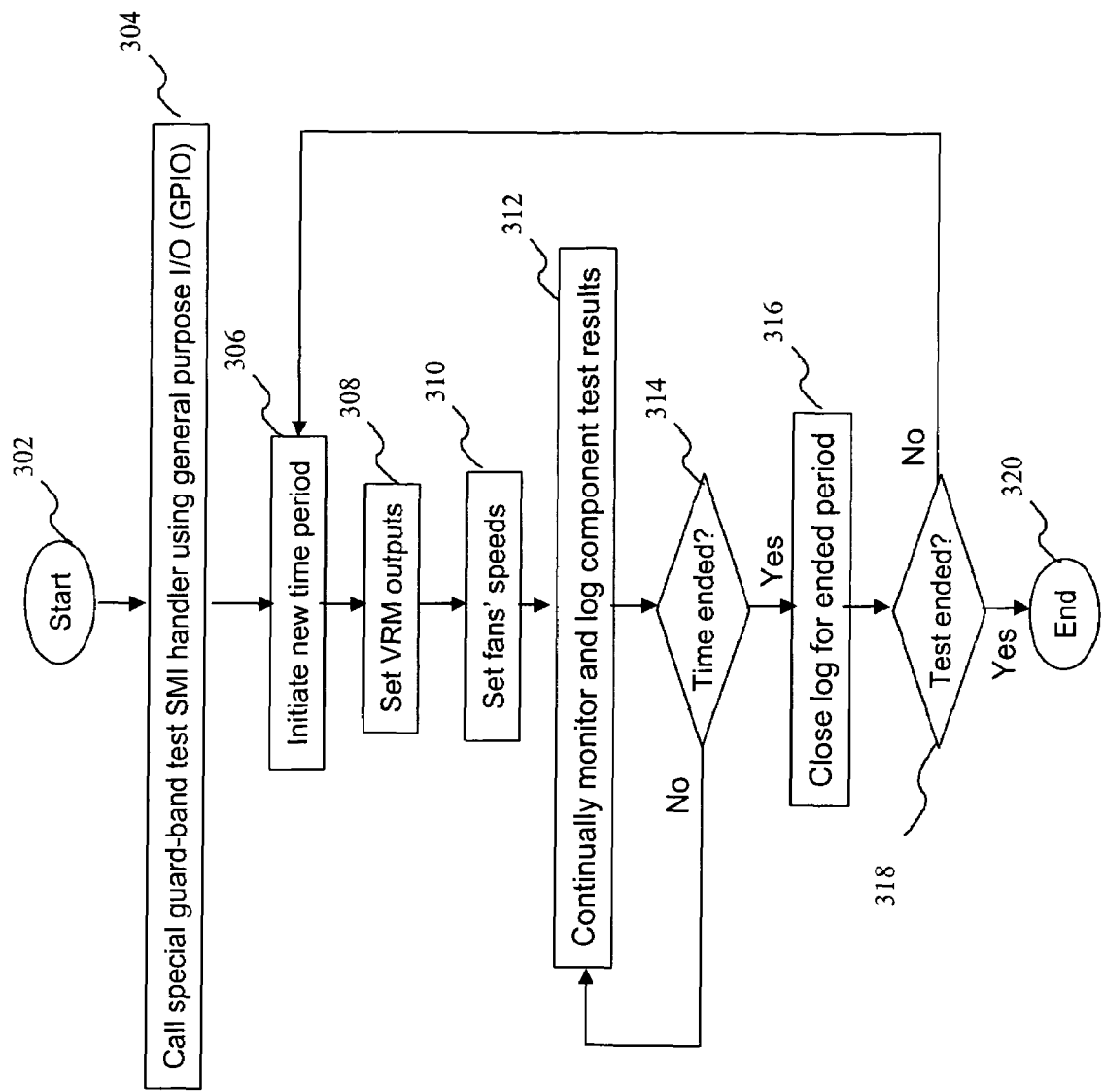
FIG. 3 is a flow-chart of exemplary steps taken in the present invention for testing a single computer.

Referring now to FIG. 3, a flow-chart of steps taken in a preferred embodiment of the present invention is provided. After initiator block 302, a General Purpose Input/Output (GPIO) known to guard-band test program 146 initializes a test routine, which calls the special guard-band test SMI handler 150 that is unique to each component system being tested (block 304). This routine reads in a table, established in guard-band test program 148, indicating how many voltage settings are available, the GPIO address to select each voltage, the time period for each voltage setting, the time period for sampling the voltage and the temperature, the time stamp period to record them, and a pattern to follow in changing the voltages. For example, if the table indicates that there are five voltage selections V1 to V5 available to impress on Vy, some patterns might be: V1, V2, V3, V4, V5, V1, V2 . . . ; V1, V3, V5, V2, V4, V1, V3 . . . ; V1, V5, V2, V4, V3, V1, V5 . . . , where V1<V2<V3<V4<V5.

Also, the guard-band test program 148 and its tables may indicate how many temperature settings are to be used, the address and method to set the fan speed, the time period for each temperature setting, the time period for sampling the voltage and the temperature, the time stamp period to record them, and a pattern to follow in changing the temperatures. For example, if the table indicates that there are five temperature selections T1 to T5 available, some patterns might be: T1, T2, T3, T4, T5, T1, T2 . . . ; T1, T3, T5, T2, T4, T1, T3 . . . ; T1, T5, TG2, T4, T3, T1, T5 . . . etc.

Referring now to block 306, a new time period is initiated for a test interval. The time period spent at each voltage and/or temperature is preferably set at a granularity of one second. For example, time periods that could be chosen by the test system designer could be one voltage change (sequential or non-sequential as described above) per 1, 2, 5 or 10 minutes. The time period for logging the time, voltage and temperature can be the same or different from changing the voltages and would be defined in increments of one second. Examples could be at the same rate as the voltage transitions or an integral number of samples between each voltage change.

The VRM outputs to different components are set (block 308), as well as the voltage levels or control signals being supplied to the fans to control their speed and thus the temperature of the system being tested (block 310). To simplify a design with more than one VRM, as described above, all VRMs could be provided with the same number of voltage selection values with the same definition, such as V1=Vmin−5%, V2=Vmin, V3=Vnom, V4=Vmax, and V5=Vmax+5%. Therefore, one voltage table and one voltage pattern would suffice for all voltage regulators even if they are implemented in different applications such as 1.5V, 2.5V, 3.3V, etc. This has the added benefit of simplified logic and reducing the number of I/O's to control the voltages as each output can control that voltage parameter for all VRMs, even when they are for different applications such as 2.5V and 3.3V.

Note that the number of unique temperature settings preferably allows for a range of temperature settings. A minimal implementation might select three temperatures determined by the minimum, nominal and maximum temperatures supported for normal operation. A more robust implementation also provides for the minimum temperature-5% and the maximum+5%. This can also be extended with more selections between or outside of these values as well as selecting different choices altogether. In a preferred embodiment, the present invention senses zone temperatures and uses this information for feedback control signals to adjust the fan speed. Thus, even though a table is specifying temperatures, the guard-band test SMI handler 150 is actually adjusting fan speed to achieve these temperatures.

During each time period, guard-band test program 148 is running tests on each component being tested. The results of these tests are continually monitored and logged as component test results (block 312). If the initial time period is completed (block 314), then the results of the guard-band test program are logged for the just ended period of time (block 316). If the intervals are set such that the transitions and logging occur at the same time, the log would take precedence and occur just before the change in voltage.

If the full test is not completed (query block 318), then a new time period is entered (either a same or different amount of time as the period that just ended), and the process continue until the full test is completed (terminator block 320).

While the present invention has been described for exemplary purposes in the preferred mode of use with a stand-alone computer housed in a single case, alternatively it may be applied to a server blade in a blade server chassis housing multiple server blades. However, testing one of the server blades may cause harm to another of the server blades in the server blade chassis (blade server). Thus, the server blade being tested according to the present invention must first be logically and/or electrically isolated before performing the steps shown in FIG. 3.

The decision to perform the steps shown in FIG. 3 may be based on any of several factors. For example, the steps shown may be taken by the manufacturer as a way of performing a guard-band test that emulates the conditions afforded by a sealed guard-band chamber at the manufacturer's facility (before the computer is shipped to the customer). Alternatively, the steps shown can be performed at the customer's site. The decision to perform the tests can be made by the customer trying to trouble-shoot an intermittent problem that is suspected of being caused by temperature or internal voltage fluxuations. Alternatively, the steps shown can be initiated by a remote location, which is connected to the single computer 102 via the network 128 shown in FIG. 1, preferably using HTTP or Internet Protocol (IP) packets to communicate with the single computer 102. A technician or system manager at the remote location may detect an operation anomaly on the single computer 102, and then run the guard-band test program 148 in an attempt to recreate the anomaly, thus identifying its cause (temperature or voltage issues).

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Note that as described, the present invention cannot generate temperatures within the device being tested that are lower than ambient (room) temperature. Thus, a "cool room" would be beneficial to test at lower temperature ranges. Such a room would not need to exactly control temperature at all times, as would be performed by a sealed guard band chamber, but should be cool enough to allow the device under test to approach lower temperature operating ranges.

Note also that the table of parameters discussed above with reference to guard-band test program 148, which table includes voltages, temperatures, time periods, etc., can be built into a Read Only Memory (ROM) or similar non-volatile memory in single computer 102, or alternatively can be modified during a manufacturing process, remotely by service personnel, on-site by the owner/user of the unit being tested, etc. Modifying this table is performed by a utility program and/or Graphical User Interface (GUI) that provides a simple interface to build up the test program table, including the programs to be called to stress the system being tested. Such programs include, but are not limited to, pushing the temperature and/or internal voltage levels within the computer/device being tested up to or beyond the minimum/maximum operating ranges of the device.

The present invention has broad application to any electronic unit that has a means to control temperature and voltage, and to record and/or provide notification of the results of changes to the temperature and voltage. Such units include but are not limited to desktop computers, portable computers, Personal Digital Assistant (PDA) devices, gaming machines, set top boxes including televisions (TVs), High Definition Televisions (HDTV), Digital Video Recorders (DVDs), Compact Disk Read Only Memory (CD-ROM) drives, Digital Versatile Disk (DVD) drives, MP3 players, Video Cassette Recorders (VCRs), etc.

While the invention has been particularly shown and described with reference to a preferred embodiment, it will be understood by those skilled in the art that various changes in form and detail may be made therein without departing from the spirit and scope of the invention.

What is claimed is:

1. A method comprising:

emulating a guard-band chamber environment within a single computer by, according to a set of test parameters, creating an emulated guard-band chamber, wherein the emulated guard-band chamber is emulated entirely within the single computer by performing the steps of:

adjusting voltage outputs of a plurality of Voltage Regulator Modules (VRMs) in the single computer, wherein the voltage outputs of the plurality of VRMs are adjusted to pre-determined non-sequential voltage levels that are within a pre-determined voltage range, and wherein the pre-determined non-sequential voltage levels fluctuate such that each successive voltage level is alternately lower or higher than a previous test voltage level according to a pre-determined voltage test pattern; and adjusting a temperature of the single computer by selectively adjusting a speed of a fan attached to the single computer; and testing the single computer under conditions created by the emulated guard-band chamber.

2. The method of claim 1, wherein the single computer is a stand-alone computer, and wherein the stand-alone computer, the plurality of VRMs and fan are all enclosed within a single enclosure.

3. The method of claim 1, wherein the single computer is a single server blade in a blade server chassis.

4. The method of claim 3, wherein the single server blade is logically isolated from other server blades in the blade server chassis before adjusting the set of test parameters.

5. The method of claim 4, further comprising: testing the single server blade under the set of test parameters.

6. The method of claim 1, wherein the steps of adjusting voltage outputs of the plurality of VRMs and selectively adjusting the fan speed are remotely performed on the single computer.

7. The method of claim 6, wherein the single computer is physically located at a remote facility of an owner of the single computer.

8. The method of claim 7, wherein the remotely performed steps are taken in response to a remotely detected operation anomaly in the single computer.

9. The method of claim 6, further comprising:
invoking an operation anomaly by adjusting the voltage outputs of the plurality of VRMs and adjusting the fan speeds in the single computer; and
generating and recording a history log that temporarily correlates the invoked operation anomaly with the voltage outputs of the plurality of VRMs and a present-state temperature of the single computer.

10. The method of claim 1, wherein at least one of the voltage outputs of the plurality of VRMs is outside the predetermined voltage range by up to 5%.

11. The method of claim 1, wherein the voltage output of one of the plurality of VRMs is adjusted according to a type of device being powered by said one of the plurality of VRMs.

12. The method of claim 1, further comprising:
varying a time period in which the voltage outputs of the plurality of VRMs and the fan speed are set at levels compliant with the set of test parameters; and
logging the voltage outputs of the plurality of VRMs and fan speed according to the time period.

13. A method for testing a computer, the method comprising:
calling a special guard-band test System Management Interrupt (SMI) in a computer using a General Purpose Input/Output (GPIO) to initiate a full test of the computer;
initiating a new test time period during the full test of the computer which is less than a time to complete the full test of the computer;
setting output voltage levels for a plurality of Voltage Regulator Modules (VRMs) according to a test program's parameters during the new test time period such that the output voltage levels are used to control a plurality of electronic devices disposed within the computer, wherein at least one of the output voltage levels of the plurality of VRMs is outside of a normal operating range by up to 5%;
setting a speed of a fan disposed within the computer using at least one of the output voltage levels according to the test program's parameters during the new test time period; and
logging results of the test program according to the new test time period.

14. The method of claim 13, wherein the output voltage levels set during the new test time period results in a series of non-sequential voltage levels being output by the plurality of VRMs during the full test of the computer according to the test program's parameters and over a plurality of new test time periods.

15. A method for testing a computer, the method comprising:
calling a special guard-band test System Management Interrupt (SMI) in a computer using a General Purpose Input/Output (GPIO) to initiate a full test of the computer;
setting output voltage levels for a plurality of Voltage Regulator Modules (VRMs) according to a test program's parameters during a new test time period such that the output voltage levels are used to control a plurality of electronic devices disposed within the computer, wherein at least one of the output voltage levels of the plurality of VRMs is outside of a normal operating range;
setting a speed of a fan disposed within the computer using at least one of the output voltage levels according to the test program's parameters during the test time period; and
logging results of the test program according to the new test time period.

16. The method of claim 15, wherein at least one of the output voltage levels of the plurality of VRMs is outside of a normal operating range by up to 5%.

17. The method of claim 15, wherein the output voltage levels set during the new test time period result in a series of non-sequential voltage levels being output by the plurality of VRMs during the full test of the computer according to the test program's parameters and over a plurality of new test time periods.

* * * * *